United States Patent [19]

Taguchi

[11] Patent Number: 4,805,474
[45] Date of Patent: Feb. 21, 1989

[54] STRUCTURE FOR SUPPORTING GOVERNOR SHAFT OF AUTOMATIC TRANSMISSION

[75] Inventor: Hiromi Taguchi, Zama, Japan

[73] Assignee: Nissan Motor Co., Ltd., Yokohama, Japan

[21] Appl. No.: 176,017

[22] Filed: Mar. 31, 1988

[30] Foreign Application Priority Data

Mar. 31, 1987 [JP] Japan .................. 62-46999

[51] Int. Cl.⁴ .............................. F16H 5/46
[52] U.S. Cl. .................. 74/404.5; 74/336.5; 384/108
[58] Field of Search .............. 74/404.5, 416, 467, 74/336.5, 424.5; 389/108, 109

[56] References Cited

U.S. PATENT DOCUMENTS

| | | | |
|---|---|---|---|
| 1,998,855 | 4/1935 | Strauss | 74/424.5 X |
| 2,181,963 | 12/1939 | Carter et al. | 74/336.5 |
| 3,375,729 | 4/1968 | Brown et al. | 74/467 |
| 3,601,515 | 8/1971 | Pelizzoni | 74/467 X |
| 4,093,320 | 6/1978 | Kaneko et al. | 384/108 |
| 4,547,081 | 10/1985 | Tanaka et al. | 384/108 |
| 4,559,842 | 12/1985 | Taguchi | 74/336.5 |

*Primary Examiner*—Peter A. Aschenbrenner
*Attorney, Agent, or Firm*—Foley & Lardner, Schwartz, Jeffrey, Schwaab, Mack, Blumenthal & Evans

[57] ABSTRACT

An automatic transmission having a reduction shaft disposed in a lower part within a transmission case is equipped with a govenor shaft having a governor shaft gear engaging with a governor drive gear formed in the reduction gear. The governor shaft extends substantially vertically from a lower end to an upper end. The lower end of the governor shaft is rotatably supported by a bottom of a governor case which is integral with the transmission case. The bottom of the governor case is located below a level of a lubricating oil in the transmission case, and formed with an opening for allowing the oil to flow into a clearance between the lower end of the governor shaft and the governor case.

2 Claims, 4 Drawing Sheets

STRUCTURE FOR SUPPORTING GOVERNOR SHAFT OF AUTOMATIC TRANSMISSION

BACKGROUND OF THE INVENTION

The present invention relates to a governor for an automatic transmission of a vehicle.

FIGS. 3 and 4 show a RN4F02A type automatic transmission of Nissan Motor Co., Ltd.

The unit of FIGS. 3 and 4 is an automatic transaxle for a front engine front wheel drive vehicle. This transaxle includes a converter housing 1, a transmission case 2, a torque converter 3, a mechanism 4 of the transmission, a reducton shaft 5, a differential case 6, a governor drive gear 7 fixed to the differential case 6, a governor shaft gear 8 in mesh with the governor drive gear 7, a speedometer pinion gear 9, a governor shaft 10, a governor case 11, a governor valve 12, and a governor cap 13. The gears 7 and 8 are designed so that intermeshing between the gears 7 and 8 produces a component of a force, acting on the governor shaft 10 in the direction toward the governor valve 12 when the vehicle is driven in the forward direction.

As shown in FIGS. 4 and 5, a stopper bolt 14 is provided for preventing the governor shaft 10 from being extracted. The governor shaft 10 is formed with an annular groove 10a for receiving the stopper bolt 14. The stopper bolt 14 is inserted from the outside of the governor case 11 through a seal washer 15 into the annular groove 10a. A similar structure is show in U.S. Pat. No. 4,559,842.

However, this conventional structure requires the annular groove 10a of the governor shaft 10, the stopper bolt 14 and the seal washer 15. Furthermore, a middle portion 14a of the stopper bolt 14 must be formed into a shape having a square cross section, and the surfaces of the annular groove 10a and the square middle portion 14a of the stopper bolt 14 must be hardened by heat treatment in order to meet the problem of wear and abrasion.

Therefore, the conventional structure is disadvantageous in that the number of components parts, and the number of steps for producing the structure are greater, and accordingly, the production cost is increased.

SUMMARY OF THE INVENTION

It is an object of the present invention to provide an automatic transmission having a structure for supporting a governor shaft, which is low in production cost.

According to the present invention, an automatic transmission comprises a transmission case, a governor driving shaft having a governor drive gear, a governor shaft extending upwardly from a lower end to an upper end, and having a governor shaft gear engaging with the governor drive gear, a governor connected with the upper end of the governor shaft, and a governor supporting means for rotatably supporting the governor shaft. The governor driving shaft is driven by a torque transmitted through the transmission. The governor supporting means has a lower portion supporting the lower end of the governor shaft. The lower portion of the governor supporting means is formed with an opening for allowing a lubricating oil in the transmission case to flow into a clearance between the lower portion of the governor supporting means and the lower end of the governor shaft.

Preferably, the lower portion of the supporting means is located below a level of the lubricating oil in the transmissio case. The opening of the lower portion extends from the interior space of the transmission case to the clearance between the lower end of the governor shaft and the lower portion of the supporting means. The supporting means is fixed to, or integral with, the transmission case.

DETAILED DESCRIPTION OF THE INVENTION

Figure 1:
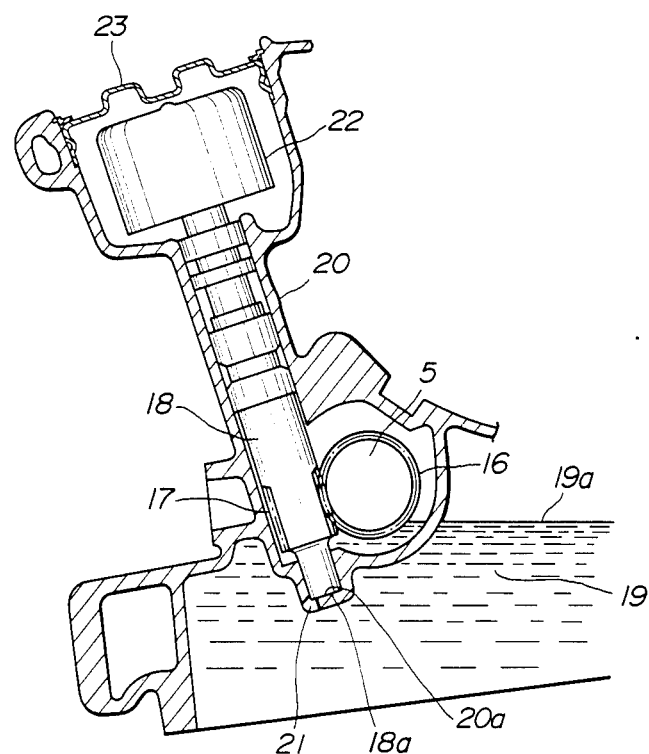
FIG. 1 is an elevation taken across a line I—I of FIG. 2 for showing one embodiment of the present invention.
Figure 2:
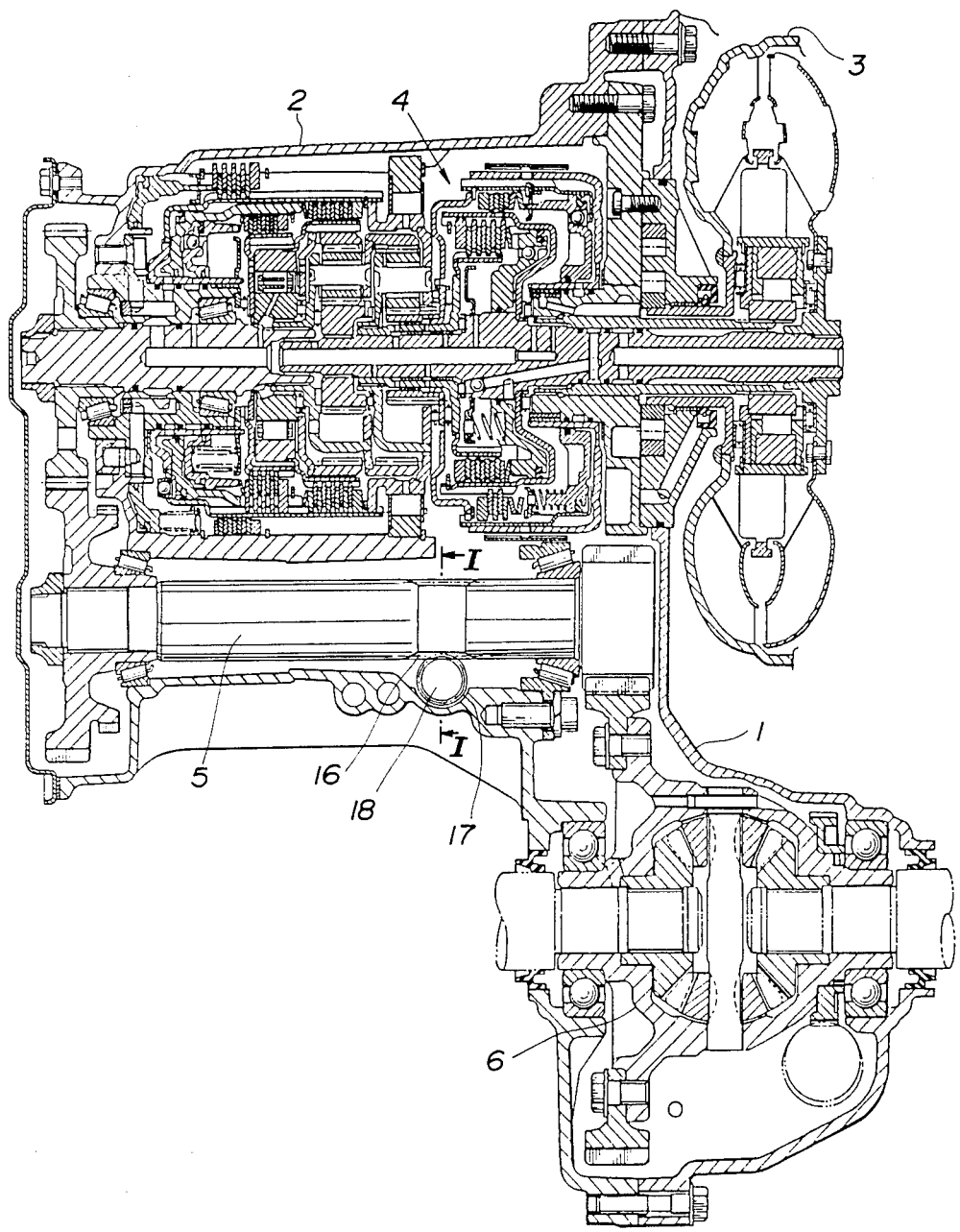
FIG. 2 is a sectional view of an automatic transmission for showing the embodiment of the present invention.

One embodiment of the present invention is shown in FIGS. 1 and 2.

Figure 3:
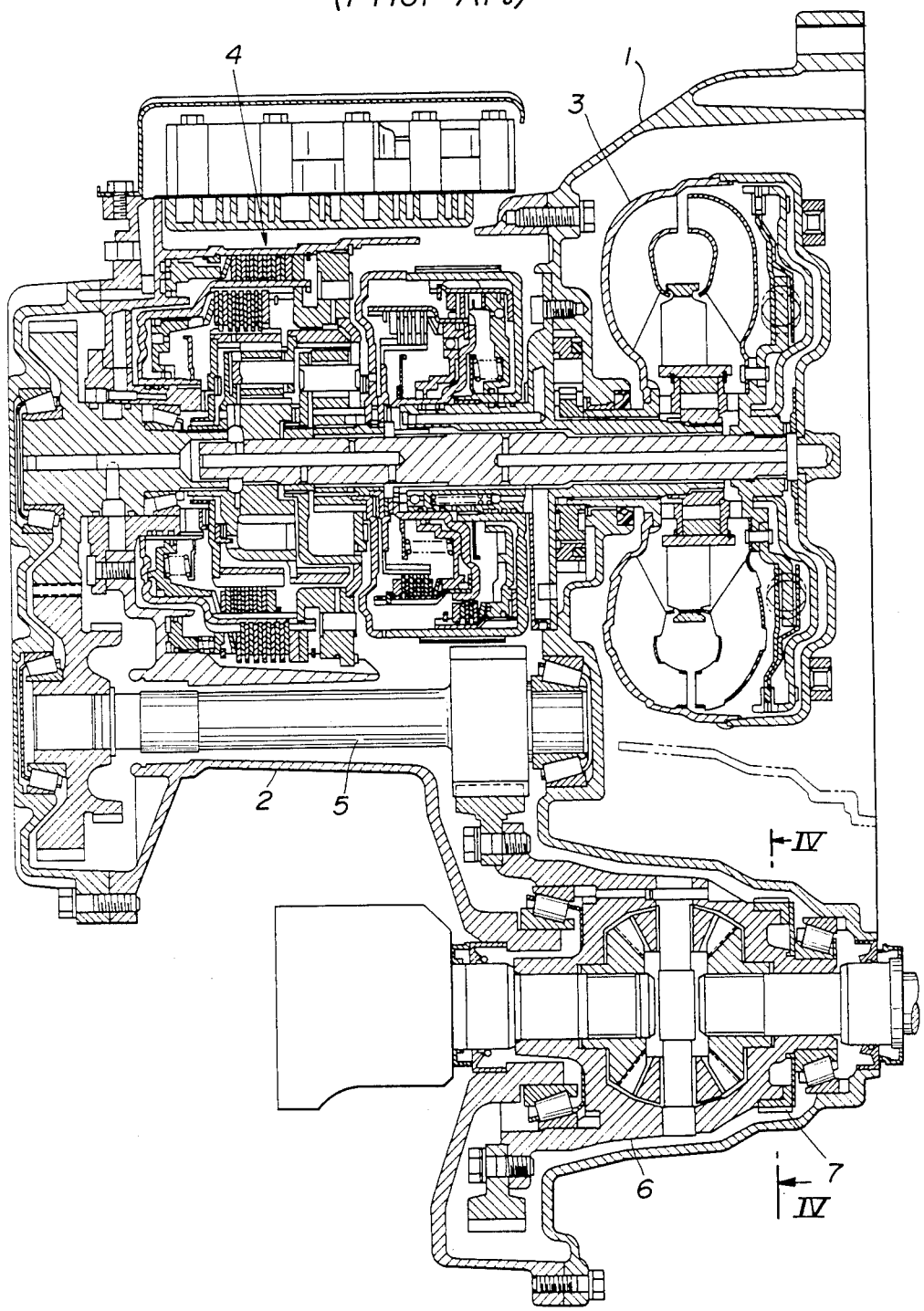
FIG. 3 is a sectional view of a conventional automatic transmission.
Figure 4:
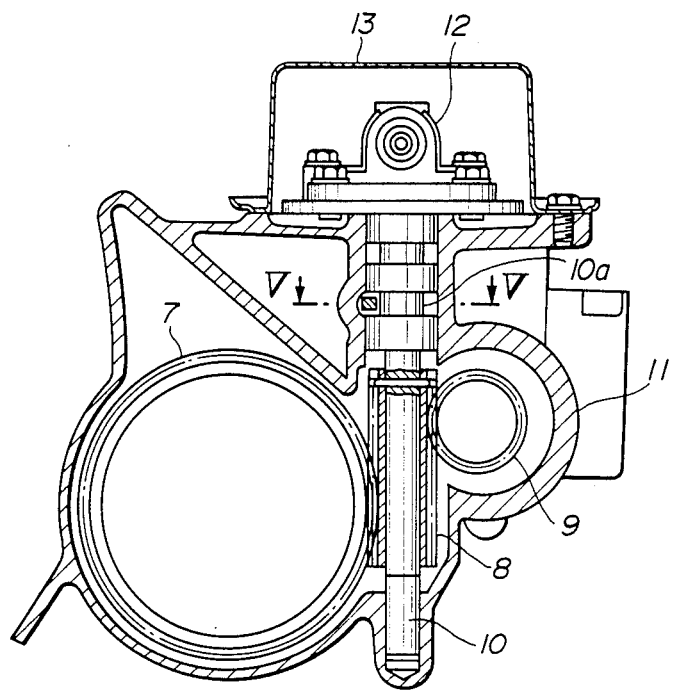
FIG. 4 is a sectional view taken across a line IV—IV of FIG. 3.
Figure 5:
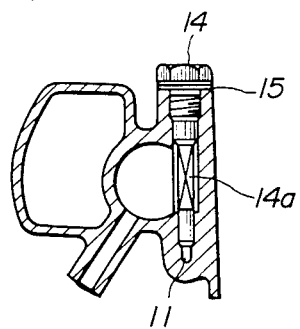
FIG. 5 is a sectional view taken across a line V—V of FIG. 4.

An automatic transaxle, for a FF vehicle, shown in FIG. 2 is basically identical to the transaxle of FIG. 3. The transaxle of FIG. 2 includes a coverter housing 1, a transmission case 2, a torque converter 3, a transmission mechanism 4 including a planetary gear train, a reduction shaft(output shaft) 5, and a differential case 6. These components are explained in a U.S. patent application Ser. No. 076,577, (filed July 22, 1987), whose disclosure is incorporated herein by reference.

In this transaxle, the torque converter 3 and the planetary gear train are arranged on a common axis, which is substantially parallel to an axis of side gears of the differential.

The reduction shaft 5 is substantially parallel to the axes of the torque converter 3, the planetary gear train and the differential. The reduction shaft 5 is disposed in a lower part of the transmission case 2, and extends substantially along a horizontal line. In this embodiment, the axis of the reduction shaft 5 is lower than the axis of the torque converter 3 and the planetary gear train of the transmission mechanism 4, and lower than the axis of the differential. One end of the reduction gear 5 has a gear in engagement with an output gear of the transmission mechanism 4. The other end of the reduction shaft 5 has a final drive pinion which is in engagement with a final drive ring gear attached to the differential case 6.

A governor drive gear 16 is formed on the outer periphery of the reduction shaft 5. As shown in FIG. 1, a governor shaft 18 extends substantially vertically from a lower end 18a to an upper end. The governor shaft 18 has a governor shaft gear 17 which is in engagement with the governor drive gear 16 of the reduction shaft 5. The governor shaft 18 is supported by a governor case 20. In this embodiment, the governor case 20 is an integral part of the transmission case 2. The governor case 20 has a bottom 20a supporting the lower end of the governor shaft 18. The bottom 20a of the governor case 20 is located, below a level of 19a of a lubricating oil 19 contained in the transmission case 2, at a position lower than the reduction shaft 5. Therefore, the bottom 20a of the governor case 20 and the lower end 18a of the governor shaft 18 are lower than the reduction shaft 5, and normally immersed in the lubricating oil 19. In the bottom 20a of the governor case 20, there is formed an opening 21 for introducing the oil 19 into a clearance between the governor case 20 and the governor shaft 18. In this embodiment, the opening 21 is formed in a rim of the bottom 20a of the governor case 20. In this embodiment, the governor drive gear 16 and the governor shaft gear 17 are designed and arranged so that a thrust is exerted on the governor shaft 18 in the downward direction toward the bottom 20a of the governor case 20 when the vehicle is driven forwardly.

A governor valve case 22 is attached to the upper end of the governor shaft 18. An upper end of the governor case 20 is closed by a governor case cap 23. The cap 23 limits an upward movement of the governor shaft 18, and prevent the governor shaft 18 from being extracted.

When the reduction shaft 5 rotates in the forward direction for driving the vehicle forwardly, the governor shaft 18 is driven by the reduction shaft 5 through the governor drive gear 16 and the governor shaft gear 17, and the governor shaft 18 rotates in the governor case 20. In this case, the bottom 20a abuts on the lower end 18a of the governor shaft 18, and sustains downward thrusts exerted on the governor shaft 18, and prevents downward axial movement of the governor shaft 18. In this structure, the bottom 20a of the governor case 20 is always submerged under the lubricating oil 19 contained in the transmission case 2, and the oil 19 is always introduced through the opening 21 into the bore of the governor case 20 which receives the lower end 18a of the governor shaft 18. Therefore, the lubricating oil 19 is always supplied, and friction between the lower end 18a of the governor shaft 18 and the bottom 20a of the governor case 20 is reduced sufficiently.

When the vehicle is driven backwardly, a thrust is exerted on the governor shaft 18n in the upward direction toward the governor case cap 23. In this case, the governor case cap 23 sustains the upward thrusts, and prevents upward axial movement of the governor shaft 18. Backward operations of the vehicle are rare, and usually short in time duration. Besides, the rotational speed is low during backward operations. Therefore, the governor case cap 23 is sufficiently durable.

The structure of this embodiment can eliminate the necessity for the stopper bolt 14 and the seal washer 15 used in the conventional structure, and further eliminate the necessity for heat treatment required in the conventional structure. Accordingly, this structure can reduce the production cost.

What is claimed is:

1. An automatic transmission comprising;
    a transmission case,
    a governor driving shaft having a governor drive gear,
    a governor shaft having a governor shaft gear engaging with said governor drive gear, and extending upwardly from a lower end to an upper end,
    a governor connected with said upper end of said governor shaft, and
    governor shaft supporting mans for rotatably supporting said governor shaft, said supporting means having a lower portion which supports said lower end of said governor shaft, and which is formed with an opening for allowing a lubricating oil contained in said transmission case to flow into a clearance between said lower end of said governor shaft and said lower portion.

2. An automatic transmission according to claim 1 wherein said lower portion is located at such a position that said lower portion is normally submerged below a level of said lubricating oil in said transmission case.

* * * * *